Patented Oct. 10, 1944

2,359,950

UNITED STATES PATENT OFFICE 2,359,950

LEVO-2,3-BUTYLENE GLYCOL AND A METHOD FOR PRODUCING THE SAME

George E. Ward, Washington, and Lynferd J. Wickerham, Orpha Glenn Pettijohn, and Lewis B. Lockwood, Peoria, Ill., assignors to Claude R. Wickard, as Secretary of Agriculture of the United States of America, and his successors in office No Drawing. Application September 22, 1942, Serial No. 459,290

2 Claims. (Cl. 195—43)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to acyclic polyhydric alcohols and is directed more particularly to levo-2,3-butylene glycol and to a method for producing the same.

The formation of 2,3-butylene glycol from carbohydrate materials by virtue of the activity of various microorganisms has been known since 1906, when Harden and Walpole (1906, Proc. Roy. Soc. London, Series B, vol. 77, pages 399–405) showed that *Bacterium lactis aerogenes* (*Aerobacter aerogenes*) formed 2,3-butylene glycol from glucose and from mannitol. Modification of nutritional and operating conditions of the microbiological reaction so as to attain a commercially feasible process was shown by Kluyver and Scheffer (U. S. Patent 1,899,156). These investigators produced 2,3-butylene glycol from carbohydrate mashes supplemented by a nitrogen compound, a phosphate and a carbonate, inoculated with bacteria such as *Clostridium polymyxa* or *Aerobacter aerogenes*, and aerated during the fermentation period.

The optical properties of the 2,3-butylene glycol obtained by this procedure, as well as those derived from other biological systems, have been studied by various investigators. Walpole (1910–11, Proc. Roy. Soc., London, Series B, vol. 83, pages 272–286) found that 2,3-butylene glycol prepared by the procedure of Harden and Walpole was essentially a mixture of two optically inactive glycols, the ratio of the two components being 9 to 1.

Boeseken and Cohen (1928, Rec. Trav. Chim., vol. 47, page 839) investigated the 2,3-butylene glycol prepared according to Kluyver's method and found it to possess a specific rotation of $+2.42°$ and a melting point of $+25°$ C. These data, in addition to unsuccessful attempts at resolution, led Boeseken and Cohen to the conclusion that the main constituent of the 2,3-butylene glycol produced by Kluyver's fermentation process is the internally compensated or meso-isomer, accompanied by a very small quantity of the dextro-isomer.

Small quantities of a levo-rotatory material consisting of 2,3-butylene glycol were prepared by Neuberg and Nord (1919, Ber. Deutschen Chem. Gesell., vol. 52, page 2252) by the reducing action of yeast on diacetyl, and by Neuberg and Kobel (1925, Biochem. Zeit., vol. 160, page 250) by the action of yeast on acetylmethylcarbinol. The specific optical rotation of these two substances was $-2.4°$ and $-5.51°$, respectively, and for reasons which will later become obvious it is apparent that the materials obtained by Neuberg and his co-workers were mixtures of stereo-isomeric 2,3-butylene glycols consisting primarily of dextro- or meso-isomers admixed with small amounts of levo-2,3-butylene glycol. The observations of Neuberg et al., are of course of no consequence as far as the manufacture of 2,3-butylene glycol is concerned, neither of the procedures being suitable for use on a commercial scale.

The highest rotation reported for either of the optically active isomers of 2,3-butylene glycol has been a value of $+6.9°$ for the dextro-isomer prepared by Chappell from dextro-2,3-butylene diamine ("A Study of 2,3-Butylene Glycol and its Derivatives," Thesis, 1935, Iowa State College, Ames, Iowa). From the laws of stereochemistry, it can be reasoned that the corresponding levo-2,3-butylene glycol would have a specific rotation of $-6.8°$. However, from data we have obtained in the course of our investigations, it is apparent that Chappell's material also must have been a mixture of stereoisomers containing meso- and dextro-2,3-butylene glycols, and that the specific rotations of the pure dextro- and levo-2,3-butylene glycols are numerically in excess of $+6.9°$ and $-6.9°$, respectively.

We have discovered that levo-rotatory 2,3-butylene glycol differing markedly in a number of physical properties from all previously known 2,3-butylene glycols can be produced by fermentation of carbohydrate materials.

We have found that certain strains of *Aerobacillus polymyxa*, especially those strains which we have isolated from soil and from spoiled starch, can readily be cultivated upon carbohydrate substrates such as grain mashes, sweet-potato mashes, sugar solutions, and the like. The fermentation process of our invention can be conducted without aeration and without the addition of supplementary nutrients, such as nitrogen-containing compounds or phosphates. We have found that as a result of the cultivation of *Aerobacillus polymyxa* on carbohydrate substrates, preferably in the aforementioned manner, there is formed as the principal product, levo-rotatory 2,3-butylene glycol, which upon isolation from the fermented mash possesses substantially the following characteristics:

Specific rotation at
 25° C _____ degrees __ −11.77 to −13.0
Refractive index at 25° C _____ 1.4307
Boiling point _____ °C __ 177
Freezing point _____ °C __ +19
Viscosity at 25° C _____ centipoises __ 41.0

The viscosity of the levo-2,3-butylene glycol produced by the process of our invention is substantially one-third of that of the 2,3-butylene glycol previously known. Furthermore, we have found that, whereas the previously described 2,3-butylene glycol forms with water a pentahydrate melting at a temperature of approximately +13° C., the product of our invention does not form such a pentahydrate. In contradistinction to the previously known 2,3-butylene glycol, these unique properties of our product render it eminently suitable for use as a freezing-point depressant and for other similar purposes. The properties of the new levo-2,3-butylene glycol as compared with those of meso-dextro-2,3-butylene glycol resulting from processes used heretofore are summarized as follows:

|  | Levo-2,3-butylene glycol | Meso-dextro-2,3-butylene glycol |
| --- | --- | --- |
| Specific rotation (25° C.) | −11.7° to −13.0° | 0.0° to +2.42°. |
| Melting point | +19° C | +25° C. to +34.4° C. |
| Refractive index (25° C.) | 1.4307 | 1.4384. |
| Viscosity (25° C.) | 41.0 centipoises | 118.0 centipoises. |
| Hydrate | None formed | Pentahydrate, M. P. +13° C. |

The method of our invention not only yields a new product but also results in a process for the manufacture of 2,3-butylene glycol which is simpler and less costly than those employed heretofore. Whereas the butylene glycol producing bacteria used by Harden and Walpole or by Kluyver and other investigators require the addition to the carbohydrate materials of nutrients or assistant agents such as nitrogen compounds, phosphates and the like, we have found that levo-2,3-butylene glycol can be produced by our process without the addition of such nutrients or assistant agents to the carbohydrate material. The omission of these compounds from the carbohydrate mashes used as substrates in our process not only reduces the cost of the starting materials but also facilitates the recovery of the butylene glycol from the fermented mash. The fact that levo-2,3-butylene glycol can be produced without aeration of the mash is an important feature of our invention which contributes to simplicity of the procedure and facilitates its operation on a commercial scale. While the production of levo-2,3-butylene glycol by our process can, if desired, be conducted with aeration of the mash, this procedure when applied to a mash containing Aerobacillus polymyxa tends to promote the formation of slime which contributes to the production of a more viscous mash and hampers subsequent filtration and recovery operations. When the fermentation is conducted in a quiescent mash, slime formation is greatly repressed if not entirely eliminated and subsequent filtration and recovery operations are facilitated.

We find it advantageous to control the hydrogen ion concentration of the substrates during the fermentation, especially when using as starting materials starchy mashes wherein diastatic activity of the bacteria is essential to a complete utilization of the carbohydrate. It is desirable to maintain the pH between 5.2 and 7.0, most satisfactory results being obtained when the pH is maintained within the range of 5.5 to 6.2. The hydrogen ion concentration of the medium may be controlled in the usual manner, that is by additions of neutralizing agents such as calcium carbonate, magnesium carbonate, sodium carbonate, sodium hydroxide, ammonium hydroxide or other compounds used commonly in the art. The neutralizing agent may be added to the medium all at once or in increments over a period of time.

As illustrative embodiments of a manner in which our invention may be practiced the following examples are given:

*Example 1*

A mash was prepared by cooking at 115° C. for 1½ hours 325 pounds of ground wheat and 21 pounds of CaCO₃ with sufficient water to make a total volume of 500 gallons. This mash was cooled to 30° C., inoculated with an actively fermenting culture of Aerobacillus polymyxa, and allowed to stand without aeration or agitation. The iodine test for starch, which was strongly positive at the beginning of the fermentation, became negative after 48 hours, at which time analysis of the mash showed the presence of 54.5 pounds of levo-2,3-butylene glycol, 1.7 pounds of acetylmethylcarbinol and 50.0 pounds of ethyl alcohol. The butylene glycol was recovered by means of extraction and distillation and was found to possess a specific rotation of −12.7° at 25° C.

*Example 2*

A mash was prepared by cooking at 115° C. for 1½ hours, 325 pounds of ground corn and 21 pounds of CaCO₃, with sufficient water to make a total volume of 500 gallons. This mash was cooled to 30° C., inoculated with an actively fermenting culture of Aerobacillus polymyxa, and allowed to stand without aeration or agitation. The iodine test for starch, which was strongly positive at the beginning of the fermentation, became negative after 40 hours, at which time analysis of the mash showed the presence of 65.2 pounds of levo-2,3-butylene glycol, 1.0 pound of acetylmethylcarbinol and 49.6 pounds of ethyl alcohol. The butylene glycol was recovered by means of extraction and distillation and was found to possess a specific rotation of −13.0° at 25° C.

*Example 3*

A mash was prepared by cooking, at 115° C. for 1½ hours, 20 pounds of sweetpotatoes and 1 pound of CaCO₃ together with 80 pounds of water. This mash was cooled to 30° C., inoculated with an actively fermenting culture of Aerobacillus polymyxa, and allowed to stand without aeration or agitation. The iodine test for starch, which was strongly positive at the beginning of the fermentation, became negative after 48 hours. Analysis of the mash showed the presence of 1.35 pounds of levo-2,3-butylene glycol, 0.10 pound of acetylmethylcarbinol and 0.90 pound of ethyl alcohol. The butylene glycol was recovered by extraction and distillation and was found to possess a specific rotation of −12.9° at 25° C.

Having thus described our invention, what we claim for Letters Patent is:

1. A process for the production of levo-2,3- butylene glycol by fermentation, which comprises preparing a cooked grain mash the constituents of said mash being grain, water, and a neutralizing agent to maintain the pH of the mash above 5.2 and below 7.0 throughout the fermentation, inoculating the cooked mash with a levo-2,3-butylene glycol producing strain of *Aerobacillus polymyxa* and maintaining the inoculated mash in a quiescent state throughout the fermentation period.

2. A process for the production of levo-2,3-butylene glycol by fermentation, which comprises preparing a carbohydrate mash, inoculating said mash with a levo-2,3-butylene glycol producing strain of *Aerobacillus polymyxa*, and cultivating the bacteria in the quiescent mash while maintaining the mash at a pH above 5.2 and below 7.0.

GEORGE E. WARD.
LYNFERD J. WICKERHAM.
O. GLENN PETTIJOHN.
LEWIS B. LOCKWOOD.